United States Patent
Mene et al.

(10) Patent No.: US 11,676,311 B1
(45) Date of Patent: Jun. 13, 2023

(54) AUGMENTED REALITY REPLICA OF MISSING DEVICE INTERFACE

(71) Applicant: International Business Machines Corporation, Armonk, NY (US)

(72) Inventors: Atul Mene, Morrisville, NC (US); Jeremy R. Fox, Georgetown, TX (US); Kushal S. Patel, Pune (IN); Sarvesh S. Patel, Pune (IN); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/456,652

(22) Filed: Nov. 29, 2021

(51) Int. Cl.
*G06T 11/00* (2006.01)
*G06V 20/20* (2022.01)
*G06T 7/73* (2017.01)

(52) U.S. Cl.
CPC ............... *G06T 11/00* (2013.01); *G06T 7/74* (2017.01); *G06V 20/20* (2022.01)

(58) Field of Classification Search
CPC ............ G06T 11/00; G06T 7/74; G06V 20/20
See application file for complete search history.

(56) References Cited

U.S. PATENT DOCUMENTS

| | | | |
|---|---|---|---|
| 8,761,517 B2 | 6/2014 | Ding | |
| 9,648,436 B2 | 5/2017 | Kraft | |
| 9,955,352 B2* | 4/2018 | Mahaffey | G06F 21/316 |
| 10,142,276 B2 | 11/2018 | Rapaport | |
| 10,366,521 B1* | 7/2019 | Peacock | G02B 27/017 |
| 10,409,382 B2 | 9/2019 | Yamamoto | |
| 10,591,730 B2* | 3/2020 | Rodriguez, II | G06F 3/0304 |
| 10,637,682 B2 | 4/2020 | Wong | |
| 10,656,720 B1 | 5/2020 | Holz | |
| 2012/0105487 A1* | 5/2012 | Son | G06F 3/011 345/671 |

(Continued)

FOREIGN PATENT DOCUMENTS

| | | |
|---|---|---|
| CN | 106094989 A | 11/2016 |
| CN | 104205015 B | 2/2018 |

OTHER PUBLICATIONS

"IBM | ARVR Design Language", UX Patterns, accessed on Sep. 23, 2021, 3 pages, <http://ibm-design-language.eu-de.mybluemix.net/design/language/experience/vrar/ux-patterns/>.

(Continued)

*Primary Examiner* — Motilewa Good-Johnson
(74) *Attorney, Agent, or Firm* — Stephen R. Yoder

(57) ABSTRACT

A method for replicating interfaces in augmented reality for missing devices is provided. A processor identifies an expected position pattern of one or more wearable devices in conjunction with an augmented reality device based on an expected usage pattern of a user. A processor compares a current position pattern of the one or more wearables user to the expected position pattern. In response to the current position pattern not matching the expected position pattern, a processor retrieves an overlay corresponding to a use case indicated by the expected usage pattern. A processor renders the overlay in the augmented reality device, where the overlay is rendered in the expected position pattern for the one or more wearable devices relative to a view of the augmented reality device.

20 Claims, 4 Drawing Sheets

(56) References Cited

U.S. PATENT DOCUMENTS

| | | | |
|---|---|---|---|
| 2015/0235240 A1 | 8/2015 | Chang | |
| 2016/0034764 A1 | 2/2016 | Connor | |
| 2016/0178906 A1 | 6/2016 | Rider | |
| 2017/0140552 A1 | 5/2017 | Woo | |
| 2017/0351828 A1* | 12/2017 | Cronin | A61B 5/0205 |
| 2018/0296135 A1 | 10/2018 | Bonnet | |
| 2019/0146219 A1* | 5/2019 | Rodriguez, II | G06F 1/163 |
| | | | 345/633 |
| 2019/0265792 A1 | 8/2019 | Wu | |
| 2020/0242361 A1 | 7/2020 | Profendiner | |
| 2021/0035364 A1 | 2/2021 | Childress | |
| 2021/0125412 A1 | 4/2021 | Paulus, Jr. | |
| 2021/0349619 A1* | 11/2021 | Crowley | G06F 3/0482 |
| 2022/0051542 A1* | 2/2022 | Alvarez | G08B 21/0283 |

OTHER PUBLICATIONS

"IBM and Unity are teaming up to bring Watson's AI to VR and AR games", accessed on Sep. 23, 2021, 6 pages, <https://thenextweb.com/news/ibm-and-unity-are-teaming-up-to-bring-watsons-ai-to-vr-and-ar-games>.

Alsop, Thomas, "Tablets—statistics & facts", Jun. 23, 2020, 14 pages, < https://www.statista.com/topics/841/tablets/>.

Baird et al., "IBM Lighthouse", IBM, accessed on Aug. 24, 2021, 3 pages, <https://w3.ibm.com/services/lighthouse/documents/160456>.

Baraniuk, Chris, "Phone sensors can save lives by revealing what floor you are on", Nov. 3, 2017, 7 pages, <https://www.newscientist.com/article/2152366-phone-sensors-can-save-lives-by-revealing-what-floor-you-are-on/>.

Disclosed Anonymously, "Method and system for controlling augmented reality content with head and facial movement pattern", An IP.com Prior Art Database Technical Disclosure, IP.com No. IPCOM000261616D, IP.com Electronic Publication Date: Mar. 20, 2020, 6 pages.

Disclosed Anonymously, "Method and System for Gesture based Controlling of Text-to-Speech Functionalities in a Device", An IP.com Prior Art Database Technical Disclosure, IP.com No. IPCOM000229441D, IP.com Electronic Publication Date: Jul. 30, 2013, 2 pages.

Disclosed Anonymously, "Method for Eye Based on Gesture Interactions with Context Aware 3D TV Video Objects", An IP.com Prior Art Database Technical Disclosure, IP.com No. IPCOM000238796D, IP.com Electronic Publication Date: Sep. 18, 2014, 6 pages.

Disclosed Anonymously, "Method for Remote Object Search and Viewing using Augmented Reality Glasses", An IP.com Prior Art Database Technical Disclosure, IP.com No. IPCOM000240512D, IP.com Electronic Publication Date: Feb. 4, 2015, 4 pages.

Fillmore et al., "AR and VR in the workplace", IBM, accessed on Aug. 24, 2021, 1 page, <https://www.ibm.com/thought-leadership/institute-business-value/report/>.

Gitter Nathan, "What I Learned Making 5 ARKit Prototypes: Five Concepts for Designing Augmented Reality Apps", Sep. 9, 2018, 7 pages, <https://medium.com/@nathangitter/what-i-learned-making-five-arkit-prototypes-7a30c0cd3956>.

Günes et al., "Augmented Reality Tool for Markerless Virtual Try-on around Human Arm", 2015 IEEE International Symposium on Mixed and Augmented Reality—Media, Art, Social Science, Humanities and Design , 2015, 2 pages, date unknown.

Karlinsky, Leonid, "IBM Research | Computer Vision and Augmented Reality", accessed on Sep. 23, 2021, 6 pages, <https://research.ibm.com//haifa/dept/imt/cvar/index.html>.

Liu et al., "Predefined Target Oriented Gesture Control", An IP.com Prior Art Database Technical Disclosure, IP.com No. IPCOM000243689D, IP.com Electronic Publication Date: Oct. 13, 2015, 8 pages.

Moren, Dan, "Try On A Virtual Apple Watch With This Augmented Reality App," Mar. 25, 2015, 2 pages, <https://www.popsci.com/try-virtual-apple-watch-app/>.

Shames, Craig, "Power Hands and Virtual Wearables," Apr. 18, 2018, 2 pages, <https://greatestideaever.wordpress.com/2018/04/18/1286-power-hands-and-virtual-wearables/>.

Zak, Robert, "How to Measure Altitude Using Your Phone", Make Tech Easier, Updated Aug. 11, 2021, 10 pages, <https://www.maketecheasier.com/measure-altitude-with-smartphone/>.

"Patent Cooperation Treaty PCT Notification of Transmittal of the International Search Report and the Written Opinion of the International Searching Authority, or the Declaration", Applicant's file reference F22W3045, International application No. PCT/CN2022/133449, International filing date Nov. 22, 2022, dated Jan. 28, 2023, 9 pages.

* cited by examiner

AUGMENTED REALITY REPLICA OF MISSING DEVICE INTERFACE

BACKGROUND OF THE INVENTION

The present invention relates generally to the field of augmented reality, and more particularly to detecting a missing device and replicating an interface within the augmented reality.

Augmented reality (AR) is the modification of a real-world environment with computer-generated information. Typically, a head mounted display (HMD) or smart glasses are worn by a user, permitting the user to see the real-world environment in addition to computer-generated information that is overlayed or displayed upon the user's view of the real-world environment. In this way, augmented reality alters or improves a user's perception of a real-world environment, whereas virtual reality typically replaces the user's real-world environment with a simulated one.

SUMMARY

Embodiments of the present invention provide a method for replicating interfaces in augmented reality for missing devices. A processor identifies an expected position pattern of one or more wearable devices in conjunction with an augmented reality device based on an expected usage pattern of a user. A processor compares a current position pattern of the one or more wearables user to the expected position pattern. In response to the current position pattern not matching the expected position pattern, a processor retrieves an overlay corresponding to a use case indicated by the expected usage pattern. A processor renders the overlay in the augmented reality device, where the overlay is rendered in the expected position pattern for the one or more wearable devices relative to a view of the augmented reality device.

DETAILED DESCRIPTION

Figure 1:
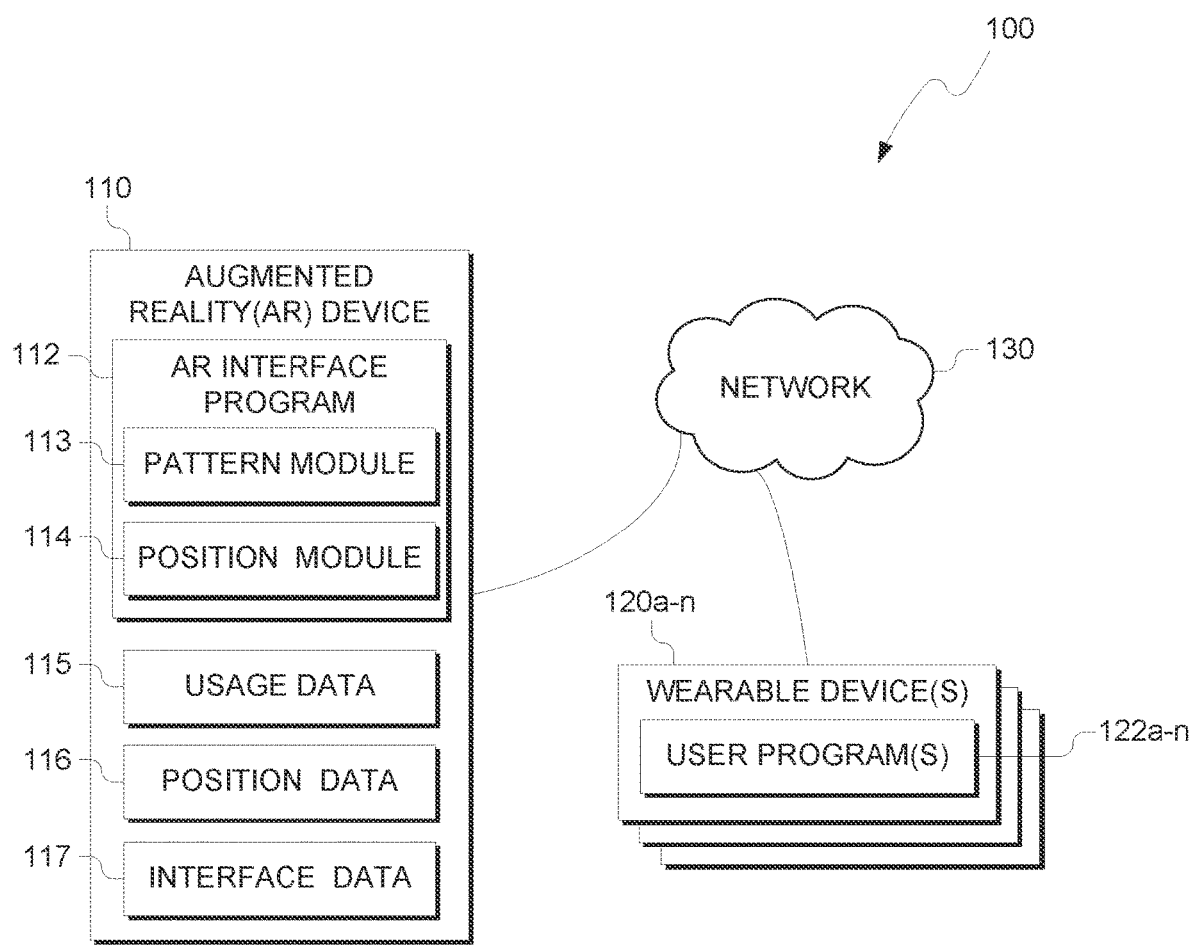
FIG. 1 is a functional block diagram illustrating a personal area networked (PAN) environment, in accordance with an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating personal network environment, generally designated 100, in accordance with one embodiment of the present invention. Personal network environment 100 includes augmented reality (AR) device 110 and wearable device(s) 120a-n connected over network 130. AR device 110 includes AR interface program 112, pattern module 113, position module 114, usage data 115, position data 116, and interface data 117. Wearable device(s) 120a-n include a respective user program 122a-n.

In various embodiments of the present invention, AR device 110 and wearable device(s) 120a-n are each a computing device that can be a standalone device, a server, a laptop computer, a tablet computer, a netbook computer, a personal computer (PC), or a desktop computer. In another embodiment, AR device 110 or wearable device(s) 120a-n each represent a computing system utilizing clustered computers and components to act as a single pool of seamless resources. In general, AR device 110 and wearable device(s) 120a-n can be any computing device or a combination of devices with access to pattern module 113, position module 114, usage data 115, position data 116, and interface data 117 and is capable of executing AR interface program 112 and user program(s) 122. AR device 110 and wearable device(s) 120a-n may include internal and external hardware components, as depicted and described in further detail with respect to FIG. 4.

In this exemplary embodiment, AR interface program 112, pattern module 113, position module 114, usage data 115, position data 116, and interface data 117 are stored on AR device 110. User program(s) 122a-n are stored on a respective wearable device(s) 120 a-n. However, in other embodiments, AR interface program 112, pattern module 113, position module 114, usage data 115, position data 116, interface data 117 and user program(s) 122a-n may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between AR device 110 and wearable device(s) 120a-n, in accordance with a desired embodiment of the present invention.

In various embodiments of the present invention, a user is in possession of an augmented reality (AR) device 110 and one or more wearable devices 120a-n. The AR device 110 and the one or more wearable devices 120a-n are connected via network 130. In various embodiments, network 130 is a personal area network (PAN) that utilizes various PAN and other ad-hoc networking protocols to communicate with one another; such as, but not limited to, BLUETOOTH®, Wireless PAN, Wireless Ad-hoc Network (WANET), and the like. In some scenarios, network 130 may also support other communications standards and permit communication with AR device 110 and the one or more wearable devices 120a-n, as well as any other device that can connect to network 130.

AR interface program 112 provides various features and functions that augment a user's perception of a real-world environment. AR device 110 is any device that displays or overlays information in a user's view of the surroundings of the user. For example, AR device 110 is a set of smart glasses that include a camera that projects AR information onto the lenses of the smart glasses. Example AR devices 110 include, but are not limited to, heads-up displays and other panels with transparent display surfaces for projecting AR information, projectors and other image displaying devices that can project AR information onto surfaces, or any device that can overlay, project or otherwise display computer-generated information within a user's view.

In various embodiments, AR interface program 112 monitors usage patterns and position patterns of wearable devices 120a-n. For example, a user has a smartwatch and a mobile phone (e.g., wearable device 120a and 120b) in addition to AR device 110. AR interface program 112 monitors and records the times that a user wears or otherwise utilizes the wearable device. As discussed herein, wearable device includes numerous smart devices such as smartwatches, that a user wears on their body. Additionally, wearable device may also include any smart device, such as a smartphone, that a user carries around on their person. As used herein, wearable device is any portable device that a user carries with them or wears on their person. Wearable device is any device that can connect to network 130 and communicate with AR device 110.

During the monitoring phase, AR interface program 112 determines which devices are worn or carried by the user, in addition to the time and geographical locations that the devices are worn or carried. Pattern module 113 retrieves time and geolocation data during a user's activities. Pattern module 113 generates usage data 115 of when and where a user frequently uses wearable devices 120a-n in conjunction with AR device 110. Pattern module 113 also monitors and identifies when wearable devices 120a-n are used in conjunction with other tasks and operations of both AR device 110 and other wearable devices 120a-n. For example, a user routinely uses the speaker in a smart watch when taking a call. Pattern modules 113 identifies that both the "Call" operation of the smartphone co-occurs frequently with connecting the speaker of the smartwatch. In such situations, AR interface program 112 determines that the co-occurrence of both frequently coincide in order to determine frequent pairings of wearable worn by the user, in addition to other usage patterns such as time/day and geographical locations when worn.

In various embodiments, AR interface program 112 determines the relative positions of AR device 110 and wearable devices 120a-n as the user wears or carries the devices. In some scenarios, AR device 110 includes a forward-facing camera that captures images of the user' view. Based on machine vison applied to the captured images, AR interface program 112 determines the locations of the person that AR device 110 and wearable devices 120a-n typically reside. In other scenarios, AR interface program 112 retrieves a signal strength of wireless communications in the user's PAN 130. Based on the signal strength and known device operation characteristics (e.g., broadcast signal strength or signal-to-noise gain), AR interface program 112 determines an approximate distance between AR device 110 and wearable devices 120a-n. In some instances, AR interface program 112 determines a latency between communicating devices in PAN 130, determining a distance between devices based on the time messages or packets take to be sent and received between AR device 110 and wearable devices 120a-n. In various embodiments, based on the retrieved data, AR interface program 112 records position data for both the AR device 110 and wearable devices 120a-n.

Based on the position and/or distances determined by AR interface program 112 of the AR device 110 and wearable devices 120a-n, AR interface program 112 generates a three-dimensional vector mapping of AR device 110 and wearable devices 120a-n within a three-dimensional space. An example vector map is discussed in detail in regard to FIGS. 3A and 3B. The vector map provides AR interface program 112 with a mapping of positions for AR device 110 and wearable devices 120a-n on the user's person. The vector map includes relative positions of each device that has been monitored to be used by the user. The vector map indicates not only where a device is located but also the direction in which the device faces. For example, a smart watch may be worn on the left wrist of a user, but also can be worn with the display facing inwards or outwards from the wrist. The vector map denotes not only the position but the expected direction the device is typically worn.

For a variety of usage patterns (e.g., different sets of wearables are used at different times or scenarios), AR interface program 112 generates different vector maps for the different identified usage scenarios. For example, a user may wear a smartwatch on the inside of the wrist when swimming or exercising and the turn the watch to the outside of the wrist when at work. For each identified usage pattern, AR interface program 112 generates a vector map that indicates the relative location and position of AR device 110 and wearable devices 120a-n.

In various embodiments, AR interface program 112 compares current usage and position information to the historic patterns in usage data 115 as well as corresponding position data 116 identified during the historic patterns of use observed by AR interface program 112. If the user begins a certain usage pattern or is otherwise expected to do so at a given time or location, then AR interface program 112 checks that the current position information of AR device 110 and wearable devices 120a-n matches previous usage patterns. For example, if a user leaves each weekday around 9 AM and carries a smart phone and smart watch, in conjunction with AR device 110, then AR interface program 112 checks to ensure the smart phone and smart watch are in the expected position as indicated by historic position data 116.

In some embodiments, AR interface program 112 notifies the user that a wearable device 120a-n is not located in the expected position. If the device is not in its expected position, AR interface program 112 generates an overlay notification that indicates the missing device. In some scenarios, the notification is overlayed as a positional notification which displays a message in an approximate location of the missing device (e.g., from the user's view of AR device 110, AR interface program 112 projects a visual notification in a display area of the AR device 110 that corresponds to the expected location of the missing device.

In various embodiments, AR interface program 112 generates a virtual interface corresponding to a missing device. When usage data 115 and position data 116 indicate that a wearable device is missing or otherwise not in an expected position based on historic usage, AR interface program 112 generates a virtual interface overlay at the expected position, relative to the display driver of AR device 110 and the user's augmented view. Therefore, when AR interface program 112 detects a missing or incorrect position for a wearable device, AR device 110 will provide a virtual interface that mimic some or all of the functionality of the wearable device.

For example, if usage patterns indicate that a user often uses a smart watch to change music tracks on playing a smart phone during a jog at a park, but current position data 116 indicates the smart watch is not connected to PAN 130, then AR interface program 112 displays a music control interface in the approximate position of the smart watch. As another example in the same scenario, the jogger is wearing the smart watch on the inside of the wrist, but typically run with the watch turn to the outside of the wrist. In this scenario, AR interface program 112 determines the position data 116 does not match since the vectors from the display point to opposite sides of the wrist from where the watch is expected to be in position. In this scenario, AR interface program 112 renders the overlay when the user is viewing the outside portion of their wrist, saving the user the effort of flipping the watch to interact with the music player interface displayed on the smart watch.

In various embodiments, AR interface program 112 retrieves interface data 117 which includes various AR interfaces that can be overlayed or displayed by AR device 110 when a wearable device 120a-n is not detected to be in an expected position based on usage patterns. Interface data 117 includes AR overlay interfaces that mimic the functionality of the device or a function of the missing device. For example, interface data 117 includes a repository of AR interfaces that correspond with known devices, such as a brand of smart watches. As another example, interface data 117 includes various functional interfaces that do not correspond to a specific device, per se, but to specific functions typical of the type of device (e.g., a music player control interface or a home automation interface).

By identifying missing or incorrectly placed wearable devices based on prior usage patterns of a user, embodiments of the present invention provide for an uninterrupted user experience when interacting with various smart devices in conjunction with AR device 110, even if the control device typically used in not present. While generating user interfaces in AR is known, prior AR interfaces do not selectively enable when a device is not present but expected to be used. By monitoring not only usage data, but also the expected position of the missing device, embodiments of the present invention can identify when devices are missing and overlay an equivalent interface, in an augmented view, at a location the user expects the interface to be located based on prior usage.

Figure 2:
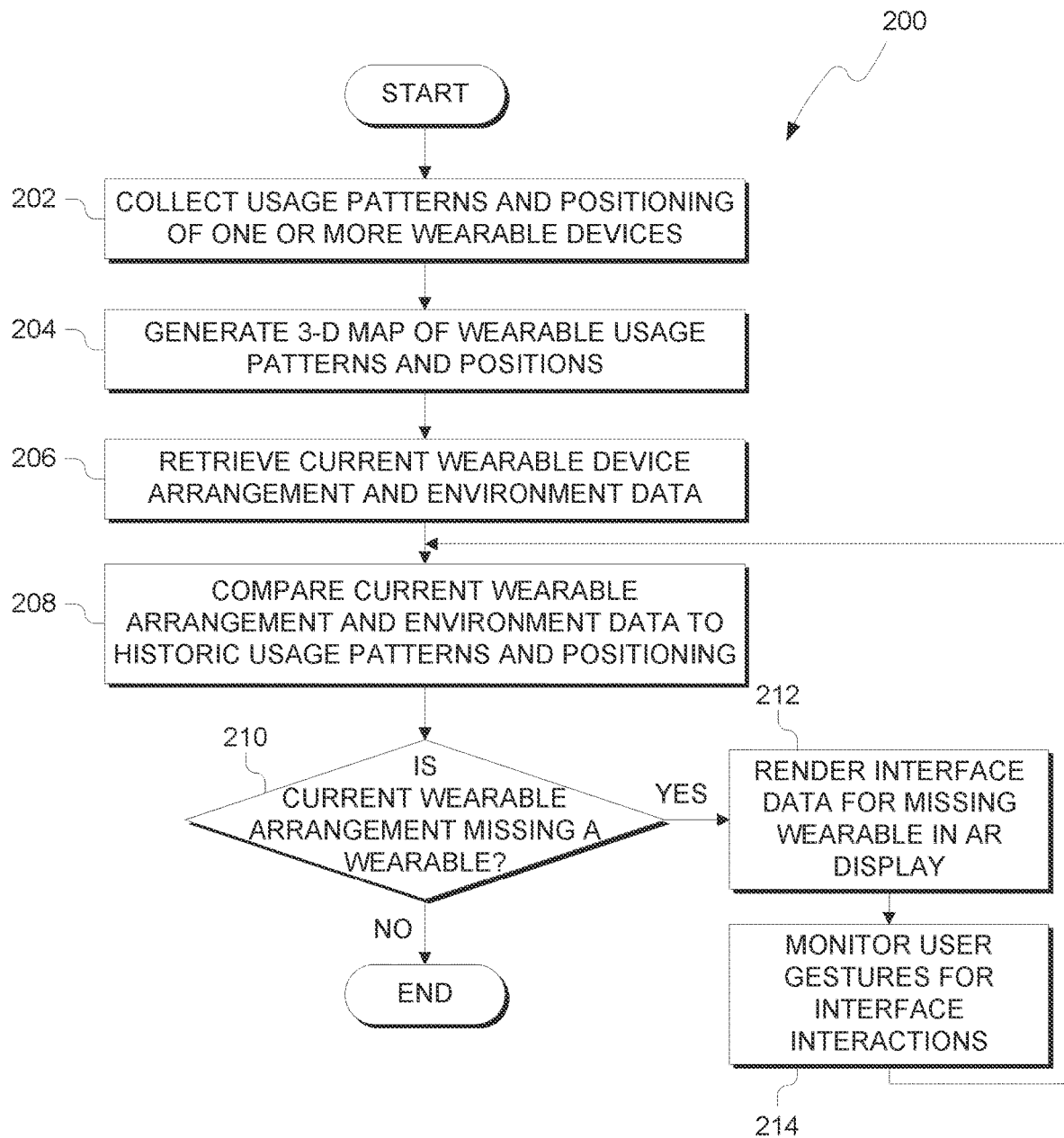
FIG. 2 illustrates operational processes of an augmented reality interface program, on a computing device within the environment of FIG. 1, in accordance with an exemplary embodiment of the present invention.

FIG. 2 illustrates operational processes, generally designated as 200, of augmented reality (AR) interface program 112. In process 202, AR interface program 112 collects usage patterns of wearables devices 120a-n (i.e., usage data 115) as well as positioning data (i.e., position data 116) of wearables devices 120a-n. Usage patterns may include, but not limited to, the following usage patterns: the combinations of wearables a user utilizes (e.g., that a smart watch and smart phone are typically used in combination or worn at similar times), locations where wearables are used (e.g., at home a smart watch is rarely used, but the user wears the smart watch more frequently when they leave for work), and time or dates that the wearables are used (e.g., a smart watch is used only on weekends). Additionally, AR interface program 112 also collects positioning data of the wearables to create a historic mapping of where wearables 120a-n a typically placed of the user's person, as well as the orientation or direction wearables 120a-n are facing.

In process 204, AR interface program 112 generates a 3-D map of wearable usage patterns and positions. For each usage pattern detected in process 202, AR interface program 112 generates a 3-D vector map that indicates the location and position of AR device 110 and any wearables 120a-n that associated with the specific usage pattern. For example, AR interface program 112 determines two usage patterns based on data collected in process 202, one for weekdays and another for weekends. On weekends the user typically wears a smart ring and on weekdays the user carries a smart phone and smart watch. In this example, AR interface program 112 generates a 3-D vector map indicating the expected location and position relative to AR device 110. As such for each usage pattern, AR interface program 112 knows the expected place the wearable should be located on the user's person. Additionally, AR interface program 112 generates vectors between each wearable such that a complete mapping of AR device 110 and relative position for each wearable 120a-n for any usage pattern can be used in predicting the expected wearables in a given scenario, as well as where each wearable should be located relative to each other as well as AR device 110.

In process 206, AR interface program 112 retrieves the current wearable device arrangement that a user currently is carrying on them as well as current environmental data. As previously discussed, AR interface program 112 can determine the distance and position each wearable 120a-n is at relative to AR device 110, such as based on signal strength or machine vision from input from a camera connected to AR device 120. The presence of the wearables could also be determined based on an active communication channel between AR device 120 and wearables 120a-n. Environmental data relates to the current times, location and other usage pattern conditions that AR interface program 112 collects and tracks in process 202.

In process 208, AR interface program 112 compares the current wearable device arrangement and environmental data to the historic usage patterns and positioning of wearables 120a-n. If a user is not wearing a wearable (or the wearable is not positioned in its expected position) for a given usage pattern, then AR interface program 112 determines the current wearable arrangement is missing a wearable (YES branch of decision process 210). If a wearable is positioned incorrectly or missing, then AR interface program 112 renders an interface for the wearable, or at least an interface for a common usage of the wearable (e.g., a music player control interface if the user commonly uses a wearable to skip music tracks). The rendered interface is projected within the augmented view of the user such that it appears to the user in approximately the same location and position of the missing wearable. As such, AR interface program 112 can still provide some or all functionality of the missing wearable. In some embodiments, AR interface program 112 may alert the user of the missing wearable when any deviation is determined in process 208 from historic usage patterns.

While rendering the AR interface for the missing wearable, AR interface program 112 monitors gestures and other inputs from the user to interact with the overlay interface for the missing wearable. Based on the design of interface data 117, various hand and other bodily gestures can be performed by the user to perform operations previously accomplished by the missing wearable. For example, a swiping motion with the left hand of the user may skip tracks in a music player interface. In various embodiments, AR interface program 112 continuously compares the current wearable arrangement to historic usage data 115 and position data 116. If the user or environmental data changes usage patterns, then AR interface program 112 checks to see if a wearable is missing for the change in usage patterns. If a user has the expected wearables 120a-n based on historic usage patterns and positioning (NO branch of decision process 210), then disables any AR interface rendered in process 214.

Figure 3A:
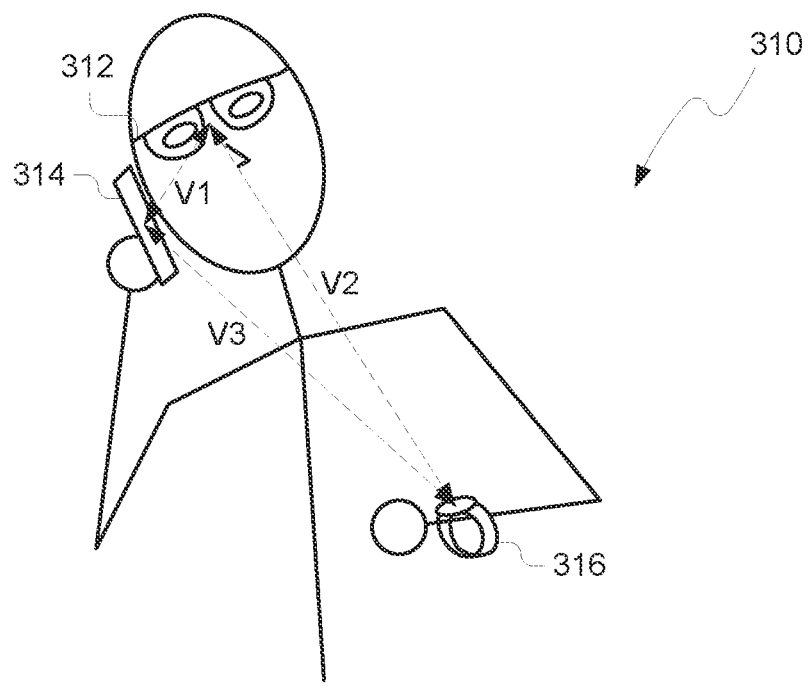
FIGS. 3A and 3B depict an example scenario of replicating an interface of a missing device within a user's personal area network.
Figure 3B:
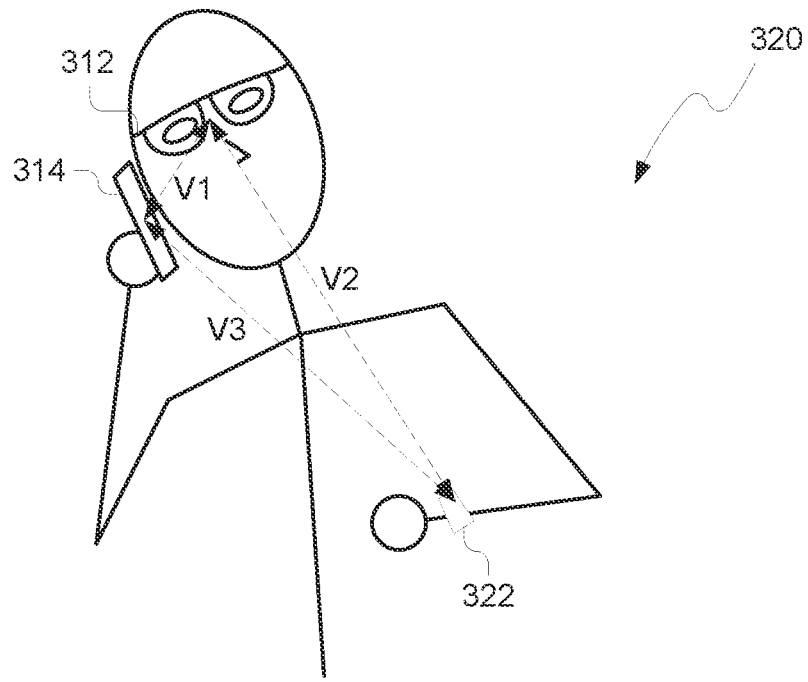

FIGS. 3A and 3B depict example scenarios, with both generally designated 310 and 320, respectively, of replicating an interface of a missing device within a user's personal area network. In scenario 310, a historic usage pattern and position is depicted. In scenarios 310, the user typically looks at smart watch 316 while talking to contacts on smart phone 314. During scenarios 310 and 320, the user is wearing AR device 312, which is a pair of smart glasses with a projector to display augmented information on top of the user's view. As discussed herein, AR interface program 112 generates a vector map, comprising vectors V1, V2 and V3, which indicate the expected location and position of AR device 312, smart phone 314 and smart watch 316.

Scenario 320 depicts a scenario where the user has forgotten to wear smart watch 316. Based on historic usage patterns, when the user engages a phone call in scenario 320 on smart phone 314, AR interface program 112 checks to see if smart watch is in the expected location and position based on vector mapping V2 or V3. If the watch is in a different location (e.g., not worn or on the other wrist) during this usage pattern, then AR interface program 112 generates interface overlay 322 within the display of AR device 312. Vector mappings V2 and V3 are used to properly project interface overlay 322 within the users view of the lenses of AR device 312. While interface overlay 322 is depicted on the user's wrist, one of ordinary skill in the art will understand that interface overlay 322 is displayed within the user's view and is a virtual interface that appears to the user to be located on the expected wrist that smart watch 316 usually is worn.

Figure 4:
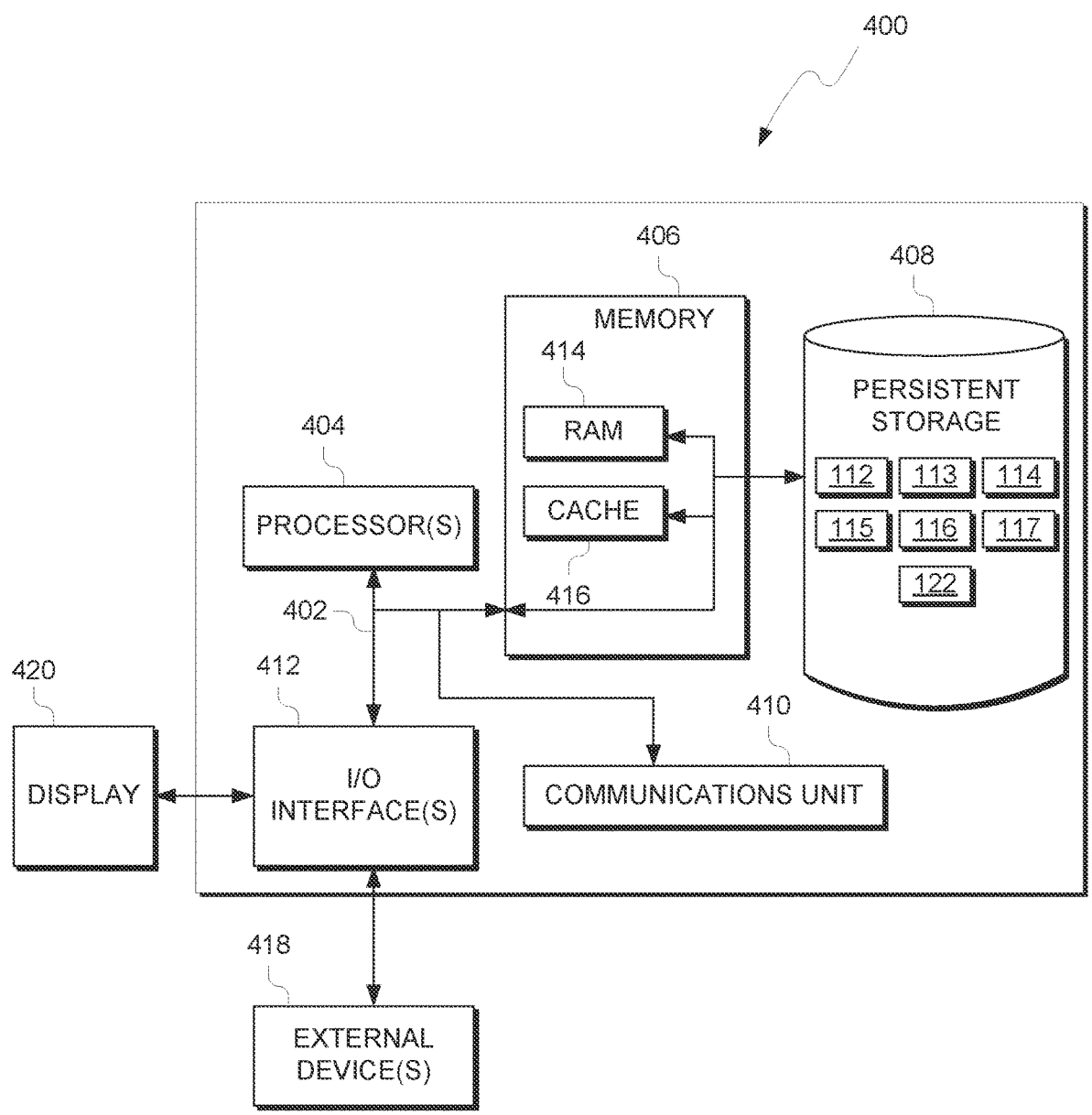
FIG. 4 depicts a block diagram of components of the computing device executing an augmented reality interface program, in accordance with an exemplary embodiment of the present invention.

FIG. 4 depicts a block diagram, 400, of components of AR device 110 and wearable device(s) 120a-n, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

AR device 110 and wearable device(s) 120a-n each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

AR interface program 112, pattern module 113, position module 114, usage data 115, position data 116, interface data 117 and user program(s) 122a-n are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 130. In these examples, communications unit 410 includes one or more network interface cards. Communications unit 410 may provide communications through the use of either or both physical and wireless communications links. AR interface program 112, pattern module 113, position module 114, usage data 115, position data 116, interface data 117 and user program(s) 122a-n may be downloaded to persistent storage 408 through communications unit 410.

I/O interface(s) 412 allows for input and output of data with other devices that may be connected to AR device 110 and wearable device(s) 120a-n. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., AR interface program 112, pattern module 113, position module 114, usage data 115, position data 116, interface data 117 and user program(s) 122a-n, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
    identifying, by one or more processors, an expected position pattern of one or more wearable devices based on historic position data of a user regarding the one or more wearable devices;
    identifying, by the one or more processors, an expected usage pattern of the one or more wearable devices based on historic usage data of the user regarding the one or more wearable devices, wherein historic usage data indicates one or more of the following: a combination of the one or more wearable devices that are utilized in the historic usage patterns, locations where the one or more wearable devices are utilized in the historic usage patterns, and dates or times where the one or more wearable devices are utilized in the historic usage patterns;
    in response to a determination that a current usage pattern of a user is indicative of the expected usage patterns of the one or more wearable devices, comparing, by the one or more processors, a current position pattern of the one or more wearables devices to the expected position pattern;
    in response to the current position pattern not matching the expected position pattern, retrieving, by the one or more processors, an overlay corresponding to a use case indicated by the expected usage pattern; and
    rendering, by the one or more processors, the overlay in the augmented reality device, wherein the overlay is rendered in the expected position pattern for the one or more wearable devices relative to the view of an augmented reality device.

2. The method of claim 1, wherein the expected position pattern is a vector-based map that indicates an expected position and an expected direction of the one or more wearable devices.

3. The method of claim 2, wherein comparing the current position pattern of the one or more wearables devices to the expected position pattern further comprises:

comparing, by the one or more processors, a current position of the one or more wearables to the expected position indicated by the vector-based map; and comparing, by the one or more processors, a current direction of the one or more wearables to the expected direction indicated by the vector-based map.

4. The method of claim 1, the method further comprising:

identifying, by the one or more processors, a missing wearable device based on the comparison of the current position pattern of the one or more wearables devices to the expected position pattern;

retrieving, by the one or more processors, an augmented reality overlay interface associated with the missing wearable device; and rendering, by the one or more processors, the augmented reality overlay interface associated with the missing wearable device.

5. The method of claim 1, the method further comprising:

identifying, by the one or more processors, a missing wearable device based on the comparison of the current position pattern of the one or more wearables devices to the expected position pattern;

retrieving, by the one or more processors, an augmented reality overlay interface associated with a function of the missing wearable device; and rendering, by the one or more processors, the augmented reality overlay interface associated with the function of the missing wearable device.

6. The method of claim 1, wherein the current position pattern is determined based on at least one image captured by the augmented reality device.

7. The method of claim 1, wherein the current position pattern is determined based on a respective signal strength of a connection between the one or more wearable devices and the augmented reality device.

8. A computer program product comprising:

one or more computer-readable storage media and program instructions stored on the one or more computer-readable storage media, the program instructions comprising:

program instructions to identify an expected position pattern of one or more wearable devices based on historic position data of a user regarding the one or more wearable devices;

program instructions to identify an expected usage pattern of the one or more wearable devices based on historic usage data of the user regarding the one or more wearable devices, wherein historic usage data indicates one or more of the following: a combination of the one or more wearable devices that are utilized in the historic usage patterns, locations where the one or more wearable devices are utilized in the historic usage patterns, and dates or times where the one or more wearable devices are utilized in the historic usage patterns;

program instructions, in response to a determination that a current usage pattern of a user is indicative of the expected usage patterns of the one or more wearable devices, to compare a current position pattern of the one or more wearables devices to the expected position pattern;

program instructions, in response to the current position pattern not matching the expected position pattern, to retrieve an overlay corresponding to a use case indicated by the expected usage pattern; and program instructions to render the overlay in the augmented reality device, wherein the overlay is rendered in the expected position pattern for the one or more wearable devices relative to the view of an augmented reality device.

9. The computer program product of claim 8, wherein the expected position pattern is a vector-based map that indicates an expected position and an expected direction of the one or more wearable devices.

10. The computer program product of claim 9, wherein program instructions to compare the current position pattern of the one or more wearables devices to the expected position pattern further comprises:

program instructions to compare a current position of the one or more wearables to the expected position indicated by the vector-based map; and program instructions to compare a current direction of the one or more wearables to the expected direction indicated by the vector-based map.

11. The computer program product of claim 8, the program instructions further comprising:

program instructions to identify a missing wearable device based on the comparison of the current position pattern of the one or more wearables devices to the expected position pattern;

program instructions to retrieve an augmented reality overlay interface associated with the missing wearable device; and program instructions to render the augmented reality overlay interface associated with the missing wearable device.

12. The computer program product of claim 8, the program instructions further comprising:

program instructions to identify a missing wearable device based on the comparison of the current position pattern of the one or more wearables devices to the expected position pattern;

program instructions to retrieve an augmented reality overlay interface associated with a function of the missing wearable device; and program instructions to render the augmented reality overlay interface associated with the function of the missing wearable device.

13. The computer program product of claim 8, wherein the current position pattern is determined based on at least one image captured by the augmented reality device.

14. The computer program product of claim 8, wherein the current position pattern is determined based on a respective signal strength of a connection between the one or more wearable devices and the augmented reality device.

15. A computer system comprising:

one or more computer processors;

one or more computer readable storage media; and program instructions stored on the computer readable storage media for execution by at least one of the one or more processors, the program instructions comprising:

program instructions to identify an expected position pattern of one or more wearable devices based on historic position data of a user regarding the one or more wearable devices;

program instructions to identify an expected usage pattern of the one or more wearable devices based on historic usage data of the user regarding the one or more wearable devices, wherein historic usage data indicates one or more of the following: a combination of the one or more wearable devices that are utilized in the historic usage patterns, locations where the one or more wearable devices are utilized in the historic usage patterns, and dates or times where the one or more wearable devices are utilized in the historic usage patterns;

program instructions, in response to a determination that a current usage pattern of a user is indicative of the expected usage patterns of the one or more wearable devices, to compare a current position pattern of the one or more wearables devices to the expected position pattern;

program instructions, in response to the current position pattern not matching the expected position pattern, to retrieve an overlay corresponding to a use case indicated by the expected usage pattern; and program instructions to render the overlay in the augmented reality device, wherein the overlay is rendered in the expected position pattern for the one or more wearable devices relative to the view of an augmented reality device.

16. The computer system of claim 15, wherein the expected position pattern is a vector-based map that indicates an expected position and an expected direction of the one or more wearable devices.

17. The computer system of claim 16, wherein program instructions to compare the current position pattern of the one or more wearables devices to the expected position pattern further comprises:

program instructions to compare a current position of the one or more wearables to the expected position indicated by the vector-based map; and program instructions to compare a current direction of the one or more wearables to the expected direction indicated by the vector-based map.

18. The computer system of claim 15, the program instructions further comprising:

program instructions to identify a missing wearable device based on the comparison of the current position pattern of the one or more wearables devices to the expected position pattern;

program instructions to retrieve an augmented reality overlay interface associated with the missing wearable device; and program instructions to render the augmented reality overlay interface associated with the missing wearable device.

19. The computer system of claim 15, the program instructions further comprising:

program instructions to identify a missing wearable device based on the comparison of the current position pattern of the one or more wearables devices to the expected position pattern;

program instructions to retrieve an augmented reality overlay interface associated with a function of the missing wearable device; and program instructions to render the augmented reality overlay interface associated with the function of the missing wearable device.

20. The computer system of claim 15, wherein the current position pattern is determined based on at least one image captured by the augmented reality device.

* * * * *